Figure 1:
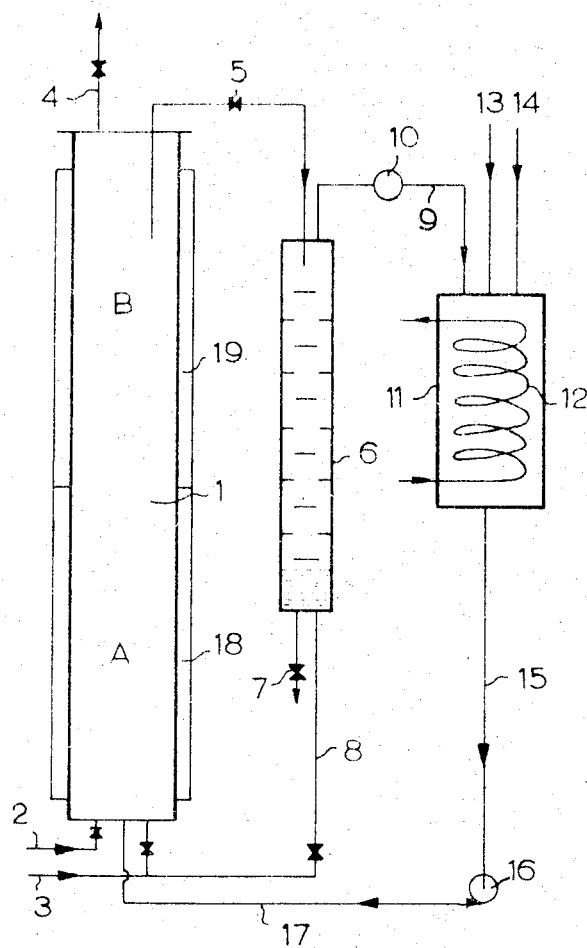

United States Patent Office 3,356,723
Patented Dec. 5, 1967

3,356,723
PREPARATION OF UREA
Petrus J. C. Kaasenbrood, Sittard, Netherlands, assignor to Stamicarbon N.V., Heerlen, Netherlands
Filed Mar. 4, 1966, Ser. No. 531,833
Claims priority, application Netherlands, Apr. 8, 1960, 250,349
7 Claims. (Cl. 260—555)

This application is a continuation-in-part of copending application, Ser. No. 100,339, filed Apr. 3, 1961, and now abandoned, and relates to a process for the preparation of urea from ammonia and carbon dioxide.

It is known that, under suitable pressure and temperature conditions, urea can be formed from ammonia and carbon dioxide by means of a two-stage reaction wherein the ammonia and carbon dioxide are first reacted to give amonium carbamate according to the equation

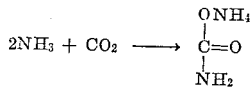

and the resulting ammonium carbamate is then converted, with evolution of water, into urea according to the equation

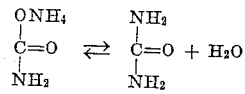

Unfortunately, the carbamate conversion is incomplete and the urea synthesis autoclave invariably discharges a urea solution containing a considerable proportion of ammonium carbamate. Further steps are, therefore, necessary to separate the carbamate from the urea.

Several methods have previously been proposed for feeding the nonconverted ammonium carbamate from the urea solution back into the urea synthesis autoclave. In these methods, the ammonium carbamate in the urea solution is first split up into $NH_3$ and $CO_2$ by expanding the melt to a lower pressure and heating. The resulting $NH_3$ and $CO_2$ gases are driven off and are subsequently absorbed in as little water as possible to give an aqueous solution or suspension of solid ammonium carbamate which may be pumped back to the urea synthesis autoclave.

It is desirable in these prior methods to keep the amount of water entering the urea synthesis autoclave as small as possible since water has an adverse effect on the formation of urea according to equilibrium reaction (2). This requirement, however, creates a further problem as discussed below.

More particularly, it has been essential, in order to obtain a urea solution which is practically free from ammonium carbamate by the methods described above, to expand the urea synthesis solution (i.e. reduce the pressure thereon from the customary pressure of around 150 to 200 atmospheres) so that the pressure on the solution is about 1 to 2 atmospheres. On the other hand, if the $NH_3$ and $CO_2$ gas obtained by decomposing the ammonium carbamate in the melt is to be condensed with as little water as possible to avoid adversely affecting reaction (2) supra, it is also necessary to carry out the condensation at a pressure much higher than 1 to 2 atmospheres, preferably 10 atmospheres or more. It will thus be seen that these prior methods are faced with somewhat conflicting pressure requirements.

To satisfy the requirements for complete removal of the ammonium carbamate from the synthesis solution in the form of $NH_3$ and $CO_2$ gas and effective condensation of this gas with the aid of as little water as possible, it has previously been proposed to expand the urea synthesis solution to an intermediate pressure of 10–30 atm., after which the urea synthesis melt is subjected to a stripping operation at this pressure by treating the same in counercurrent relation with a circulating auxiliary gas which is inert with regard to the synthesis melt. The gases expelled by this stripping operation are then condensed, uncondensed auxiliary gas being re-used for the stripping treatment, and the condensed gases being fed back to the urea synthesis autoclave (Belgian patent specification 581,293, United Kingdom patent specification 853,220 and U.S. patent specification 3,120,563).

A drawback to said procedure is that a large volume of auxiliary gas must always be kept in circulation and this is not economically arrtactive. Moreover, this inert auxiliary gas interferes with the heat transfer during the subsequent condensation of the expelled gases and it is obviously important for this phase of the operation to have the best possible heat transfer. A further drawback is that this inert auxiliary gas will decrease the partial pressure of the $NH_3$ and $CO_2$ in the gases expelled by the stripping operation. The reduction of the partial pressures will increase as the ratio between the amount of auxiliary gas and stripped-off $NH_3$ and $CO_2$ becomes greater, which is the case when the stripped-off gases are condensed. A consequence of a lower partial pressure of the $NH_3$ and $CO_2$ is that the said gases condense to carbamate at a lower temperature so that the heat of condensation will also become available at lower temperatures. If these temperatures are below 150° C. even more water will be needed for maintaining the carbamate liquid.

The principal object of the present invention is to provide a novel process for preparing urea from $NH_3$ and $CO_2$ which obviates problems encountered in the prior art as discussed above. A more particular object of the invention is to provide an improved way of stripping $CO_2$ and $NH_3$ from the urea synthesis solution. A further object is to condense the stripped-off gases, in the absence of an inert auxiliary gas, at a high pressure and without substantial addition of water to a carbamate solution, the said condensation being carried out at such a high temperature —due to the high pressure conditions—that the generated heat of condensation can be used for regeneration of steam. Other objects will also be hereinafter apparent.

Broadly stated, the present invention is based on the finding that $CO_2$ can be used, in lieu of an inert auxiliary gas as heretofore proposed, for the purpose of stripping carbamate from the urea synthesis solution even if the stripping treatment is carried out under a high super atmospheric pressure of 50 atm. or much higher. Thus, according to the invention, the urea synthesis melt is stripped by treating the same with $CO_2$ under high pressure thereby giving a urea solution which has a low percentage of $CO_2$ and ammonium carbamate therein and a gaseous mixture of the $CO_2$ stripping gas and expelled gas. Depending on the height of the condensation pressure this gaseous mixture of $NH_3$, $CO_2$ and $H_2O$ can be condensed without or with the addition of a minimum of water, the resulting carbamate solution being fed back to the autoclave for further reaction.

In order to enable the gases driven out to be condensed without or with addition of a minimum of water, the stripping treatment and condensation should be carried out at a pressure of at least 50 atm. Preferably these operations are effected at a pressure equal to the urea synthesis pressure because then no pump is needed for recompressing gases or condensed gases up to urea synthesis pressure and an expansion valve for reducing the pressure of the urea synthesis solution to a pressure at which the solution is stripped can also be omitted because no reduction of pressure in necessary. On the other hand the pressure in the stripper should be too high, because otherwise the temperature for decomposing the carbamate into $NH_3$ and $CO_2$ would become so high that undesired side reactions such as conversion of urea into biuret or decomposition of urea into $NH_3$ and $CO_2$ would assume inadmissable proportions. Therefore preferably the stripping process is carried out at pressures lower than 150 atm.

When the urea synthesis is carried out at a relatively low pressure, e.g. in the range of 110–140 atm., then it is advantageous not to change the pressure and to maintain the same pressure in autoclave and stripper. However, if the urea synthesis is carried out at a much higher pressure, e.g. 200 atm., then it is preferred to decrease the pressure of the autoclave effluent and to strip with $CO_2$ at a pressure in the range of about 50 to 140 atm.

The advantages according to the present process, that is:

(a) condensation of the stripped $NH_3$ and $CO_2$ to a carbamate solution with as little water as possible, and
(b) regeneration of steam by means of the heat generated by said condensation, can only be achieved if the stripping process and the condensation of the stripped gases is carried out at a pressure above 50 atmospheres. The practical upper limit of the pressure in the stripping treatment lies at approximately 140 atm. at higher pressures the temperature during the stripping treatment will become so high that an intolerable amount of the urea will be converted into biuret and $NH_3$.

In principle, it is also possible to strip the urea solution with gaseous ammonia. However, this is less favorable as the urea solution to be carried off, although almost completely freed of ammonium carbamate, will in this case contain a large amount of dissolved $NH_3$ and extensive provisions must be made to recover this $NH_3$ and recirculate it to the urea synthesis. It will be appreciated that the great advantage of the present process is that it eliminates the necessity of circulating the inert stripping gas previously used, and that the heat of condensation of the stripped-off $NH_3$ and $CO_2$ becomes available at so high a temperature level that this heat can be used for steam generation.

Since $NH_3$ and $CO_2$ are added to the urea synthesis and only the stripped urea solution is taken away, the molar ratio between the amounts of $NH_3$ and $CO_2$ to be added to the process should in principle be kept equal to 2, subject to whatever correction might be necessary to compensate for losses in starting material. These losses occur mainly in the venting of inert gas which is introduced with the $CO_2$, and the small amounts of $NH_3$ and $CO_2$ dissolved in the stripped urea solution which is taken off as product.

According to the invention, part of the amount of $CO_2$ to be processed, for instance, ca. ±25% by weight thereof, may be fed into the carbamatereaction zone or the urea synthesis at once and the rest of the $CO_2$ may first be used in the stripping treatment and may then be fed into the carbamatereaction zone or the urea synthesis in the form of a carbamate solution obtained by condensing the $CO_2$ stripping gas and the gas expelled from the urea solution without or with addition of a minimum amount of water.

An alternative way of carrying out the present invention is to have the stripping treatment take place in the urea synthesis autoclave itself. The reaction components are fed into the autoclave in countercurrent relation and the urea melt which is formed is discharged at one end of the autoclave in such a way that, before leaving the autoclave, the melt undergoes a stripping treatment therein with the introduced $CO_2$.

Figure 2:
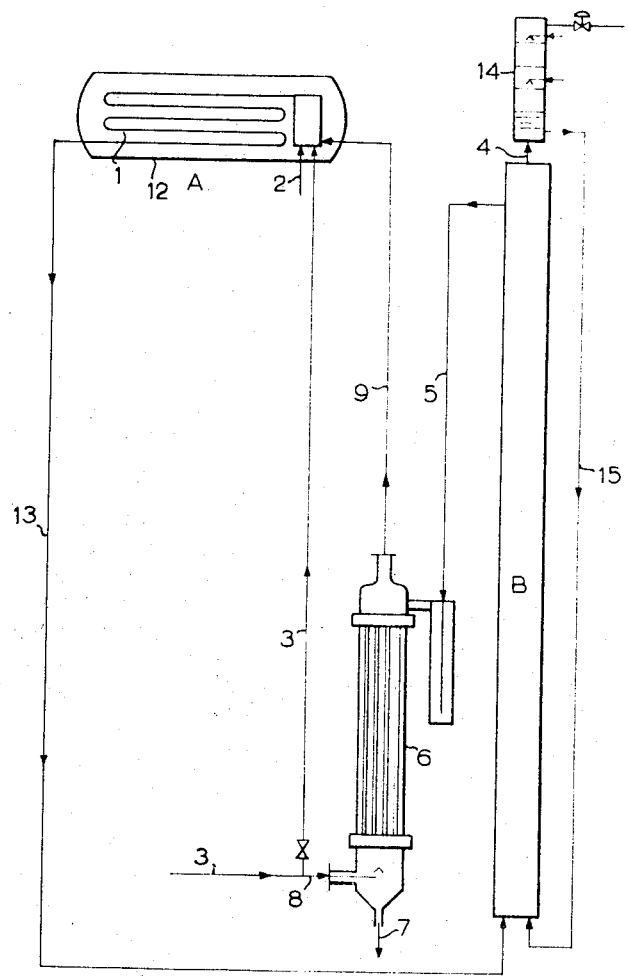
Figure 3:
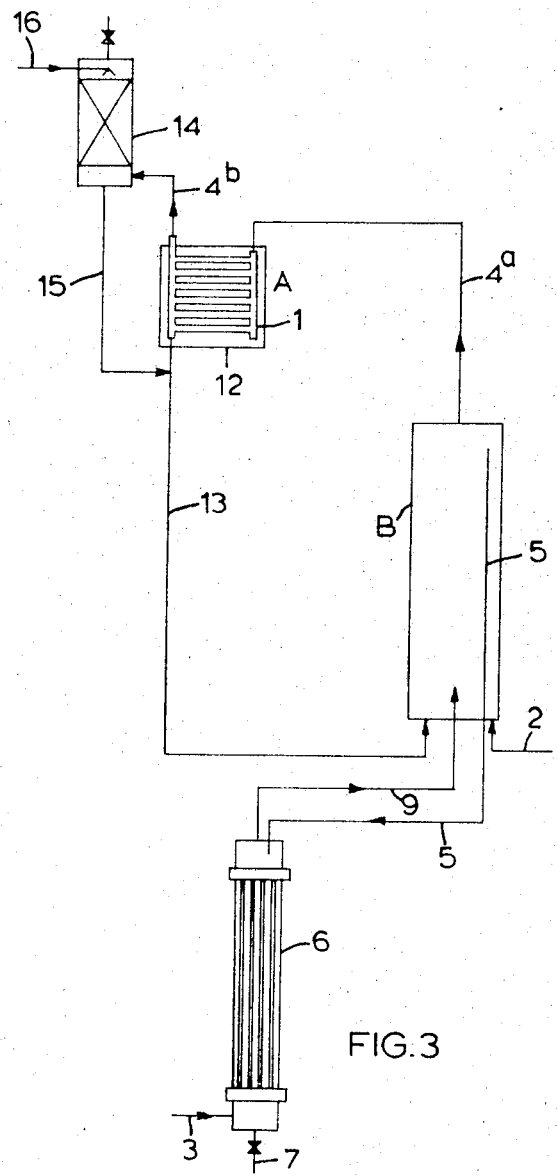

The process according to the invention is diagrammatically illustrated in the accompanying drawing wherein FIGURE 1 shows a diagram of an installation for carrying out the process, in which stripping takes place at a pressure lower than the urea synthesis pressure and FIGURES 2 and 3 are diagrams of installations in which stripping is effected at a pressure equal to the pressure of the urea synthesis autoclave.

According to FIGURE 1, the reaction components $NH_3$ and $CO_2$ are continuously introduced into a urea synthesis autoclave 1 through conduits 2 and 3, respectively. These components first form ammonium carbamate in the lower part A of the autoclave. The reaction heat released by this highly exothermic reaction is carried off with the aid of water flowing through the cooling jacket 18. The ammonium carbamate is converted in section B of the autoclave into urea, the degree of conversion varying between 50 and 70% depending on the pressure and temperature conditions prevailing therein. Usually, the pressure and temperature in the autoclave will be between 160 and 200 atmospheres and 160 and 190° C. and the reaction time will be of the order of 10 to 40 minutes.

To maintain the correct temperature, section B of the reactor may be provided with a heating jacket 19 and at its upper end the autoclave is provided with a discharge tube 4 to vent any inert gases present in the $NH_3$ and $CO_2$.

The urea solution formed, which contains a large amount of ammonium carbamate in addition to urea and water, is continuously carried off through expansion valve 5 to the stripping column 6, in which a superatmospheric pressure is maintained.

Through a conduit 8 at the bottom of the stripping column, $CO_2$ is admitted to strip the urea solution moving down through the stripping column. In this process, the ammonium carbamate present splits up into $NH_3$ and $CO_2$ and these gases pass upward with the $CO_2$ added as stripping medium. The stripping column 6 is provided with heating spirals or heating tubes (not shown). Typically, the temperature of the melt coming in at the top of stripping column 6 may be 180 to 150° C. and the pressure therein will usually be of the order of 50 to 100 atmospheres.

The gas mixture formed in the stripping column flows to the condenser 11 through a conduit 9 provided with a blower 10. The pressure in condenser 11 is equal to or slightly higher than in the stripping column and the gas mixture is condensed to give an ammonium carbamate solution, which may, or may not, contain free $NH_3$.

To facilitate condensation, liquid $NH_3$ and water may be admitted to the condenser 11 through conduits 13 and 14, respectively. The heat of condensation is absorbed and carried away by the liquid present in the cooling spiral 12. This heated liquid can be put to good use in the heat spirals or tubes (not shown) of the stripping column 6. The temperature of the condensate in condenser 11 will usually vary between 130 to 160° C. The amount of liquid $NH_3$ added for condensing purposes will usually comprise 10 to 20% by weight of the resulting solution (i.e. the condensate); addition of thus amount of liquid ammonia will bring the overall molar $NH_3/CO_2$ ratio in the resulting solution at a value of 2.3 to 2.4.

If desired, all of the $NH_3$ needed for the process may be supplied through conduit 13 instead of using both the conduits 2 and 13.

The ammonium carbamate solution formed by the condensation in condenser 11 contains little water (e.g. not more than 1 to 10% by weight of the solution) due to the relatively high pressure, e.g. 100 to 50 atmospheres, at which the condensation is carried out. This solution may be fed into the autoclave 1 through conduit 15, pump 16 and conduit 17.

Urea solution containing only a very small amount of carbamate (e.g. not more than 2 to 5% by weight) is discharged through conduit 7 at the bottom of stripping column 6.

FIGURE 2 shows a modification of the installation of FIGURE 1. In the installation of FIGURE 2 the function of the condenser 11 of FIGURE 1 is taken over by the carbamate synthesis reactor. According to FIGURE 2, $NH_3$ and $CO_2$ are continuously introduced into an ammonium carbamate synthesis reactor A through conduits 2 and 3, respectively. The ammonium carbamate synthesis reactor being a tube system 1 surrounded by a waterfilled cooling jacket 12. In this cooling jacket the water is converted into steam by the heat released by the exothermic carbamate reaction. The ammonium carbamate melt flows through a conduit 13 into the urea autoclave B wherein the ammonium carbamate is converted into urea.

The urea solution is at its upper end provided with a discharge tube 4 to vent inert gases present in the $CO_2$. These inert gases may be washed in a scrubber 14 in order to recover $NH_3$ and $CO_2$ which are carried along with the inert gases. The resulting ammonium carbamate solution is passed back to the autoclave through conduit 15.

The urea melt formed in the autoclave is continuously carried off through conduit 5 to the stripping column 6, in which the pressure is preferably kept equal to that in the carbamate reactor and urea autoclave. Through a conduit 8 at the bottom of the stripping column, $CO_2$ is admited to strip the urea melt moving down through the stripping column. The stripping column may be constructed, as a tube condensor, as shown in the drawing, wherein the urea solution is flowing downwards as a film along the inside of the externally steam heated tubes. The $CO_2$-stripping gas then passes upwardly through the tubes in contact with the downcoming film of urea solution that is to be stripped. The heating steam in the tubes delivers to said solution the heat needed for decomposing the dissolved carbamate into gaseous ammonia and carbon dioxide.

This arrangement has the advantage that the urea film providing increased contact area is subjected to a high temperature, but for a short time only. To ensure that the amount of heat so supplied will suffice for effecting adequate removal of ammonia and carbon dioxide and, on the other hand, will not be so large as to cause any appreciable formation of biuret and hydrolysis of urea into ammonia and carbon dioxide, the steam temperature should be kept between 200 and 235° C., which corresponds to a pressure of 15–30 at.

The gas mixture formed in the stripping column flows to the carbamate synthesis reactor A through a conduit 9.

According to FIGURE 3 $NH_3$ and $CO_2$ are continuously fed in the urea-synthesis autoclave B and stripping column 6 through conduits 2 and 3 respectively. The urea solution formed in the autoclave is continuously carried off through overflow conduit 5 to the stripping column 6, the pressure in the stripping column is kept equal to the pressure in the urea synthesis autoclave. $CO_2$ fed through conduit 3 and the gases expelled from the urea solution in the stripping column flow to the urea synthesis autoclave B through conduit 9. The conversion of carbamate into urea and water takes place in the urea synthesis autoclave, which is neither cooled nor heated externally. The heat needed for the conversion of liquid carbamate into urea and water is obtained by partial condensation of the stripper gases fed through the reaction mixture. To keep the temperature in urea synthesis autoclave optimum it is esesntial to feed additional $NH_3$ to the stripper gases or to the reaction mixture, preferably in liquid form and in such an amount that the gases leaving the autoclave through the top thereof and flowing to the carbamate-condenser A via conduit 4a will have a molar $NH_3/CO_2$ ratio in the range from 2 to 3, preferably in the range between 2.3 and 2.4, because the condensation in the carbamate condensor will then take place at the optimum temperature.

In this carbamate-condenser the gases are cooled in a tube system 1 surrounded by a waterfilled jacket 12. The water is converted into steam by the heat released by the exothermic carbamate reaction. A gas mixture containing uncondensed $NH_3$ and $CO_2$ and inert gases, flows from the carbamate condenser via conduit 4b to a scrubber 14 in order to recover the $NH_3$ and $CO_2$. The resulting solution is discharged through conduit 15 and passed back to the urea synthesis autoclave through conduit 13 together with the carbamate melt formed in the tube system 1 of the carbamate condenser A.

A urea solution, largely freed of ammonium carbamate, is carried off from the stripping column through conduit 7.

This urea solution is further subjected to an expansion in the usual way (not shown) to a pressure of ca. 3 atm. to effect decomposition of carbamate still present in the urea solution. The $NH_3$ and $CO_2$ formed from this decomposed carbamate are absorbed in water to yield a carbamate solution, which may be fed through conduit 16 to the scrubber 14 to be used as washing liquid, and so be recycled to the urea synthesis autoclave.

Although the molar ratio between the amount of $NH_3$ supplied through conduits 2 of FIGURES 1, 2 and 3 and 13 of FIGURE 1 and the amount of $CO_2$ supplied through the conduits 3 of FIGURES 1, 2 and 3 and 8 of FIGURE 2 must be two since a reaction product having this molar ratio is carried off through conduit 7, it is possible, by previously pumping in liquid $NH_3$ or $CO_2$, to make the urea synthesis proper always take place at an ammonia/$CO_2$ ratio which is higher or lower than two, as has been suggested before. When the apparatus shown in FIGURE 1 is used, this excess reactant will then constantly circulate through conduit 5, column 6, conduit 9, condenser 11, conduits 15 and 17, and the autoclave 1.

However, in the present process, it is somewhat undesirable to use molar $NH_3/CO_2$ ratios which deviate significantly from two. More particularly, any significant deviation from the mole ratio of two makes it more difficult to drive out the carbamate and $NH_3$ that has not been converted. Accordingly, it is best to choose the synthesis conditions so as to maintain the molar $NH_3/CO_2$ ratio of the supplied reactants between 1.5 and 3.5.

The invention is illustrated, but not limited, by the following examples wherein parts and percentages are by weight unless otherwise indicated.

*Example 1*

A synthesis melt obtained under synthesis pressure of 200 atm. and having the following composition by weight: urea (+biuret ca. 0.3%) 37.3%; water 11.2%; $NH_3$ 27.5%; and $CO_2$ 24.0% was fed into stripping column 6 of the apparatus shown in FIGURE 1, a pressure of 67 atmospheres being maintained in the column.

58% of the $CO_2$ needed was introduced into the bottom part of stripping column 6. The remaining 42% of the $CO_2$ was pumped directly into the urea synthesis autoclave through conduit 3, the autoclave being operated at 180° C. and 125 atmospheres pressure.

The gas mixture $NH_3+CO_2+H_2O$ carried off from the top part of stripping column 6 was condensed in condenser 11 at a pressure of 67 atm., and a temperature of 140° C. At the same time, part of the liquid $NH_3$ needed for the urea synthesis was added through conduit 13 and a solution containing, by weight, 44% $NH_3$; 52% $CO_2$ and 4% $H_2O$ was pumped from the condenser to the urea synthesis autoclave.

A urea solution having the following composition in percent by weight: urea (+biuret circa 0.3%) 74.6%; water 20.4%; $NH_3$ 1.0%; and $CO_2$ 4.0% was continuously discharged from the stripping column 6 through conduit 7 and urea was recovered therefrom in conventional fashion by further expansion and evaporation.

*Example 2*

In a urea synthesis plant as shown in FIGURE 2 a urea synthesis melt obtained under a synthesis pressure of 125 atm. and having the following composition by weight:

| | Percent |
|---|---|
| Urea+biuret | [1] 36.5 |
| $H_2O$ | 11.2 |
| $NH_3$ | 30.0 |
| $CO_2$ | 17.0 |

[1] 0.15% biuret.

was fed at a temperature of 182° C. into the stripping column 6 countercurrently to a flow of $CO_2$ under urea synthesis pressure so the pressure in the stripping column was kept equal to the pressure in the urea synthesis column. The amount of $CO_2$ being substantially equal to the amount of $CO_2$ chemically bound in the urea discharged from the stripping column. The urea solution discharged through conduit 7 had the composition:

| | Percent |
|---|---|
| Urea+biuret | [1] 64.4 |
| $H_2O$ | 26.0 |
| $NH_3$ | 4.2 |
| $CO_2$ | 5.4 |

[1] 0.4% biuret.

The gas mixture, carried off from the top of the stripping column through conduit 9 was fed into the tube system 1 of the carbamate condenser A; through conduit 2 so much $NH_3$ was fed that in the carbamate condenser the molar ratio between $NH_3$ and $CO_2$ was 2.4:1; the formation of carbamate in the carbamate condenser was effected at 125 atm. and 160° C. The so produced carbamate melt was fed via conduit 13 into the urea synthesis column, into which further the aqueous solution, discharged from the scrubber 14 and having a composition of 34% by weight of $NH_3$, 40% by weight of $CO_2$ and 26% by weight of water was fed via conduit 15.

It will be appreciated that various modifications may be made in the invention described herein without deviating from the scope thereof as set forth in the following claims wherein:

I claim:
1. In a continuous process for the preparation of urea wherein $NH_3$ and $CO_2$ are reacted at elevated temperature and pressure to continuously provide an ammonium carbamate melt, thereafter in an autoclave, said melt being converted into a urea solution containing ammonium carbamate and the carbamate being stripped from said solution by decomposing said carbamate into $NH_3$ and $CO_2$ by heat and expelling $NH_3$, $CO_2$ and $H_2O$ from said solution, the improvement which comprises continuously stripping the urea solution with $CO_2$ in a stripping zone outside said autoclave and at a pressure of at least 50 atmospheres up to urea synthesis pressure wherein the urea solution flows downwardly along the inside of externally steam heated tubes in the stripping zone and $CO_2$ stripping gas passes upwardly in said tubes in contact with said urea solution, the pressure of the heating steam being in the range of 15–30 atm., whereby $NH_3$ and $CO_2$ are expelled from said solution, condensing the resulting mixture of $CO_2$ gas and gases expelled from said urea solution after addition of further $NH_3$ and at a pressure of at least 50 atmospheres up to urea synthesis pressure to form a carbamate solution and returning the thus formed carbamate solution to said autoclave for further urea synthesis.

2. The process of claim 1 wherein so much ammonia is added to the gas-mixture to be condensed that the molar $NH_3/CO_2$ ratio therein is in the range of 2.3 to 2.4.

3. The process of claim 1 wherein the urea synthesis melt is at a pressure of more than 140 atmospheres and the stripping column is at a pressure of 50 to about 140 atmospheres.

4. The process of claim 1 wherein the pressure in the stripping column is approximately equal to the urea synthesis pressure said pressure being in the range of 110–140 atm.

5. The process of claim 1 wherein from 2 to about 10 percent of water based on the weight of the carbamate solution is added during the condensation of the expelled gases.

6. The process of claim 5 wherein liquid ammonia is also used in said condensation.

7. The process of claim 1 wherein about 75% by weight of the carbondioxide reacted in the ammonium carbamate synthesis is first used for stripping, the balance being fed directly to the ammonium carbamate synthesis.

References Cited

UNITED STATES PATENTS 3,120,563    2/1964    Bongard _____ 260—555

FOREIGN PATENTS 853,220    11/1960    Great Britain.

OTHER REFERENCES

Krase et al.: The Journal of Industrial and Engineering Chemistry, volume 14 (1922), pp. 611–616.

HENRY R. JILES, *Primary Examiner.*

UNITED STATES PATENT OFFICE
CERTIFICATE OF CORRECTION

Patent No. 3,356,723                        December 5, 1967

Petrus J. C. Kaasenbrood

It is hereby certified that error appears in the above numbered patent requiring correction and that the said Letters Patent should read as corrected below.

Column 1, lines 20 to 23, "(1)" should appear to the right of the equation; lines 27 to 30, "(2)" should appear to the right of the equation; column 2, line 12, for "counercurrent" read -- countercurrent --; line 22, for "arrtactive" read -- attractive --; column 3, line 13, for "in", first occurrence, read -- is --; line 14, for "should be" read -- should not be --; column 5, line 75, for "esesntial" read -- essential --; column 8, line 32, for "from 2 to about 10" read -- from 1 to about 10 --.

Signed and sealed this 25th day of February 1969.

(SEAL)

Attest:

Edward M. Fletcher, Jr.

Attesting Officer

EDWARD J. BRENNER

Commissioner of Patents